US012627439B2

(12) United States Patent
Wang et al.

(10) Patent No.: US 12,627,439 B2
(45) Date of Patent: May 12, 2026

(54) UPDATE APERIODIC SRS TRIGGER LIST USING MAC-CE

(71) Applicant: QUALCOMM Incorporated, San Diego, CA (US)

(72) Inventors: Runxin Wang, San Diego, CA (US); Muhammad Sayed Khairy Abdelghaffar, San Jose, CA (US); Alexandros Manolakos, Escondido, CA (US); Pinar Sen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 675 days.

(21) Appl. No.: 18/010,196

(22) PCT Filed: Jun. 2, 2021

(86) PCT No.: PCT/US2021/035526
§ 371 (c)(1),
(2) Date: Dec. 13, 2022

(87) PCT Pub. No.: WO2022/046234
PCT Pub. Date: Mar. 3, 2022

(65) Prior Publication Data
US 2023/0254087 A1      Aug. 10, 2023

(30) Foreign Application Priority Data
Aug. 24, 2020      (GR) .............................. 20200100505

(51) Int. Cl.
*H04L 5/00*          (2006.01)

(52) U.S. Cl.
CPC .......... *H04L 5/0051* (2013.01); *H04L 5/0096* (2013.01)

(58) Field of Classification Search
CPC ..... H04L 5/0051; H04L 5/0096; H04L 5/001; H04L 5/0053
See application file for complete search history.

(56) References Cited

U.S. PATENT DOCUMENTS

| | | | |
|---|---|---|---|
| 2020/0059338 A1 | 2/2020 | Joseph et al. | |
| 2020/0106647 A1* | 4/2020 | Chen ..................... | H04W 72/04 |
| 2023/0049134 A1* | 2/2023 | Liu ........................ | H04L 5/0096 |

(Continued)

OTHER PUBLICATIONS

"Remaining details on SRS design in NR", 3GPP TSG RAN WG1 Meeting AH 1801, Vancouver, Canana, Jan. 22-26, 2018 (R1-1800758) (Year: 2018).*

(Continued)

*Primary Examiner* — Sun Jong Kim
(74) *Attorney, Agent, or Firm* — Procopio, Cory, Hargreaves & Savitch LLP

(57) ABSTRACT

A configuration to allow for an SRS resource set trigger list configuration to be updated using MAC-CE. The apparatus transmits, to a UE, an SRS resource set trigger list configuration via RRC signaling. The apparatus transmits, to the UE, an updated trigger list value via MAC-CE to update the SRS resource set trigger list configuration. A trigger state of at least one SRS resource set is updated based on the updated trigger list value. The apparatus receives, from the UE, at least one SRS based on the updated SRS resource set trigger list configuration.

30 Claims, 14 Drawing Sheets

(56) References Cited

U.S. PATENT DOCUMENTS

2023/0269043 A1 * 8/2023 Matsumura .......... H04W 72/04
370/329

OTHER PUBLICATIONS

International Search Report and Written Opinion—PCT/US2021/035526—ISA/EPO—Sep. 27, 2021.
Lenovo, et al., "Enhancements on SRS", 3GPP Draft, 3GPP TSG RAN WG1#102-e, R1-2005824, 3RD Generation Partnership Project (3GPP), Mobile Competence Centre, 650, Route Des Lucioles, F-06921, Sophia-Antipolis Cedex, France, vol. RAN WG1, No. e-Meeting, Aug. 17, 2020-Aug. 28, 2020, Aug. 7, 2020 (Aug. 7, 2020), XP051915049, 3 pages, sec.2. 1, p. 1-p. 2.
Nokia, et al., "Remaining Details on SRS Design in NR", 3GPP Draft, 3GPP TSG RAN WG1 Meeting AH 1801, R1-1800758, 3RD Generation Partnership Project (3GPP), Mobile Competence Centre, 650, Route Des Lucioles, F-06921, Sophia-Antipolis Cedex, France, vol. RAN WG1, No. Vancouver, Canada, Jan. 22, 2018-Jan. 26, 2018, Jan. 13, 2018 (Jan. 13, 2018), XP051385068, 4 pages, the whole document.

* cited by examiner

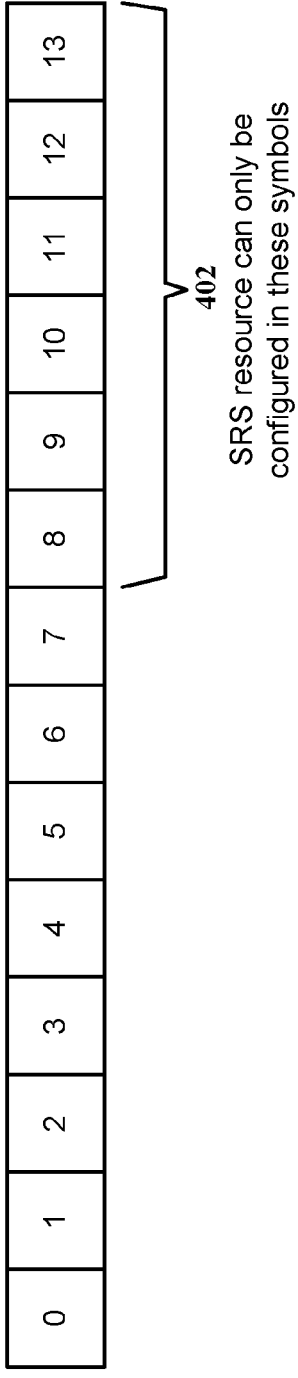
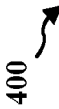
FIG. 4

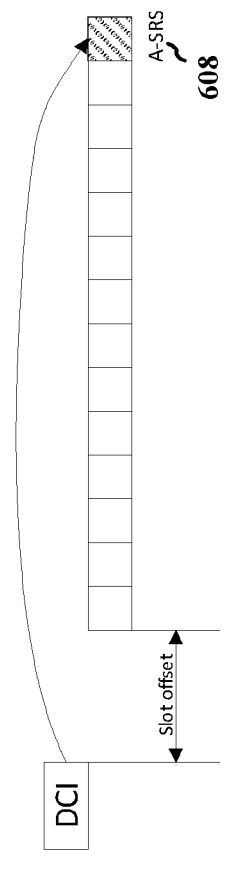
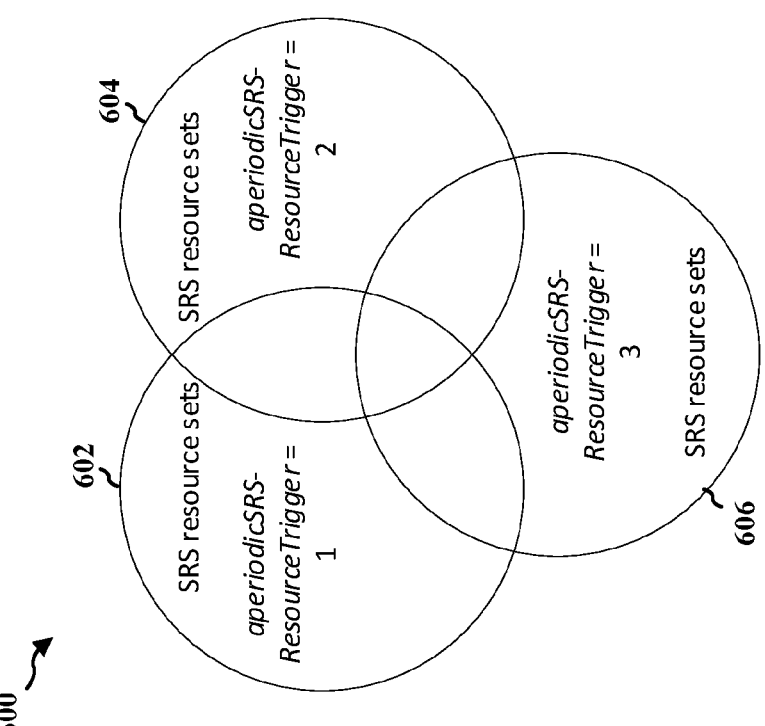
FIG. 6

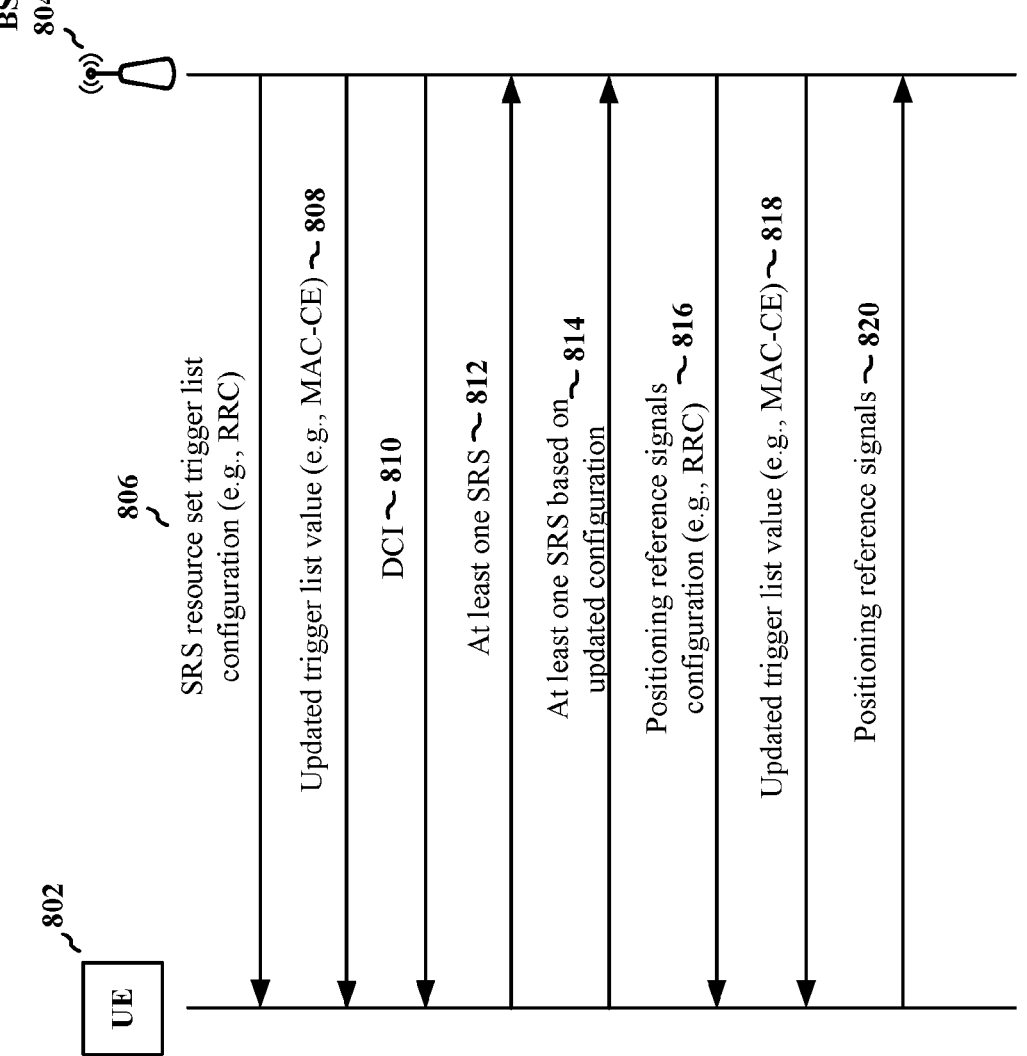
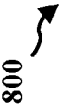
FIG. 8

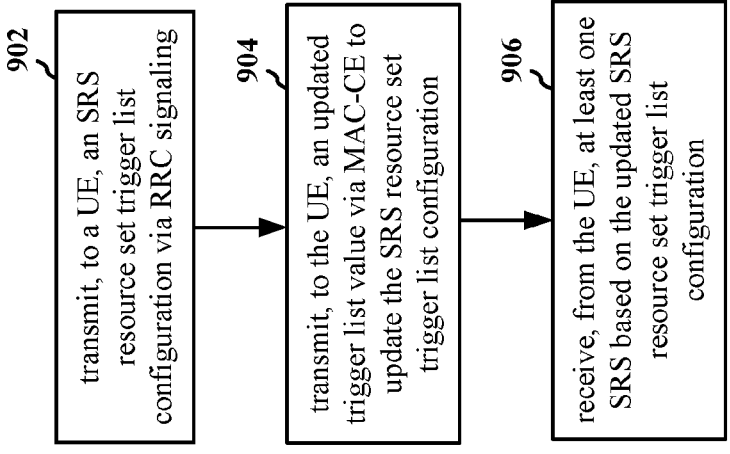
902
transmit, to a UE, an SRS resource set trigger list configuration via RRC signaling
904
transmit, to the UE, an updated trigger list value via MAC-CE to update the SRS resource set trigger list configuration
906
receive, from the UE, at least one SRS based on the updated SRS resource set trigger list configuration
900
FIG. 9

1002 transmit, to a UE, an SRS resource set trigger list configuration via RRC signaling

1004 transmit, to the UE, an updated trigger list value via MAC-CE to update the SRS resource set trigger list configuration

1006 transmit, to the UE, DCI to trigger the at least one SRS resource set

1008 receive at least one SRS based on the SRS resource set trigger list configuration prior to the updated SRS resource set trigger list configuration being enabled

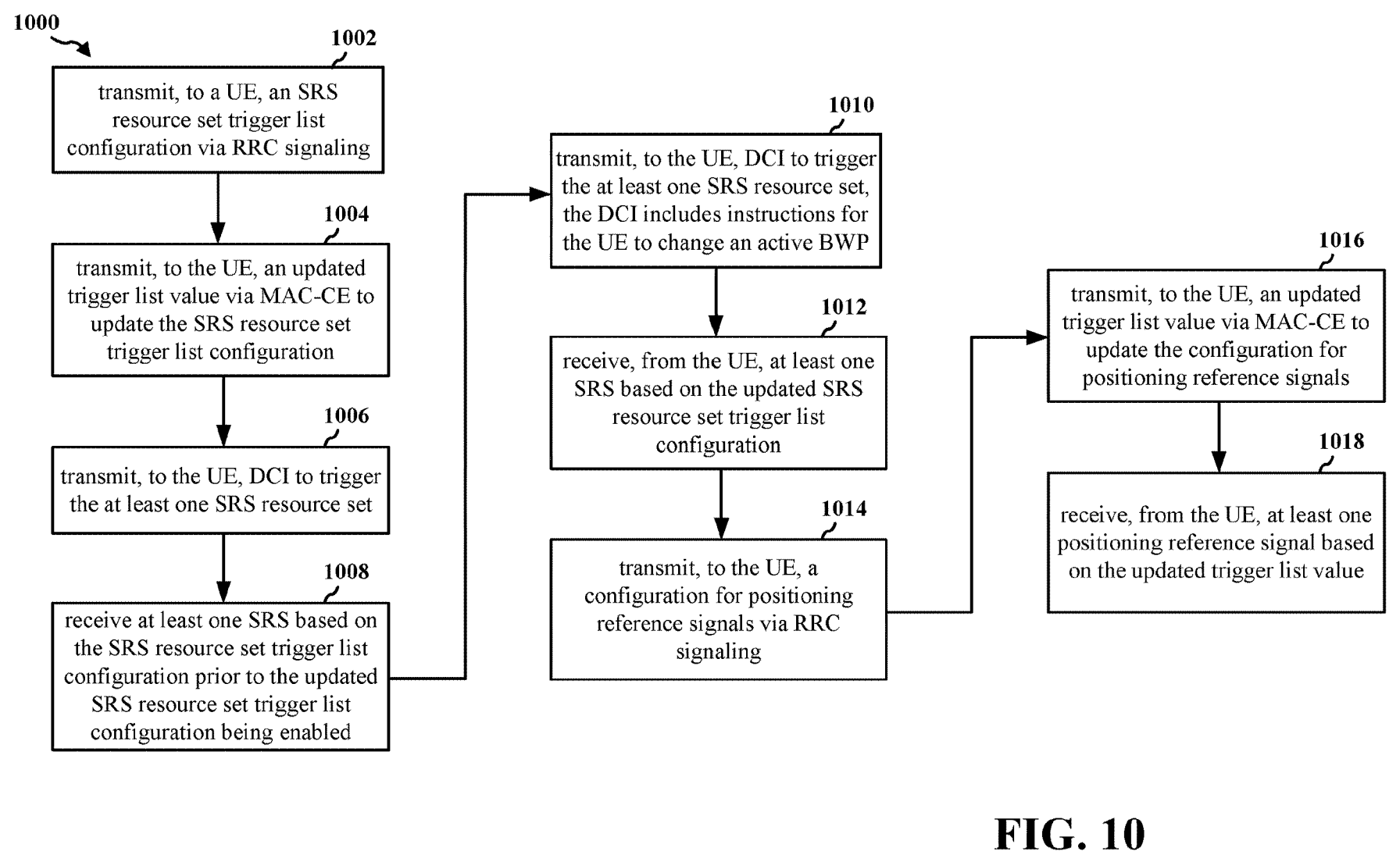

1000

1010 transmit, to the UE, DCI to trigger the at least one SRS resource set, the DCI includes instructions for the UE to change an active BWP

1012 receive, from the UE, at least one SRS based on the updated SRS resource set trigger list configuration

1014 transmit, to the UE, a configuration for positioning reference signals via RRC signaling

1016 transmit, to the UE, an updated trigger list value via MAC-CE to update the configuration for positioning reference signals

1018 receive, from the UE, at least one positioning reference signal based on the updated trigger list value

FIG. 10

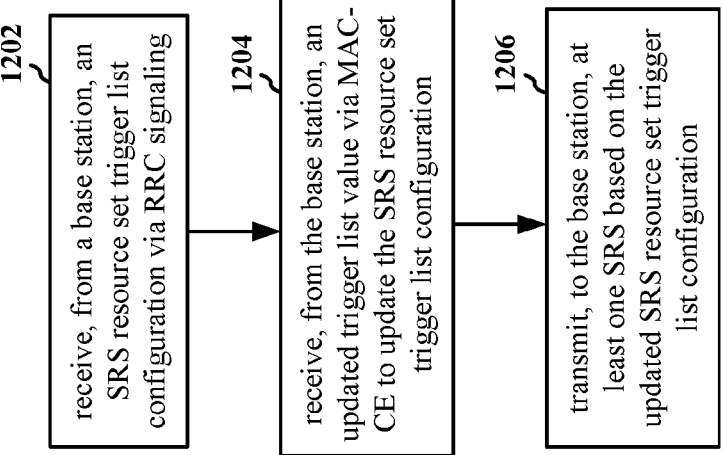
1202
receive, from a base station, an SRS resource set trigger list configuration via RRC signaling
1204
receive, from the base station, an updated trigger list value via MAC-CE to update the SRS resource set trigger list configuration
1206
transmit, to the base station, at least one SRS based on the updated SRS resource set trigger list configuration
1200
FIG. 12

UPDATE APERIODIC SRS TRIGGER LIST USING MAC-CE

CROSS REFERENCE TO RELATED APPLICATION(S)

This application is National Stage Application filed under 35 U.S.C. § 371 of PCT International Application No. PCT/US2021/035526, entitled "UPDATE APERIODIC SRS TRIGGER LIST USING MAC-CE" and filed Jun. 2, 2021, which claims the benefit of and priority to Greek Patent Application Serial No. 20200100505, entitled "Update Aperiodic SRS Trigger List Using MAC-CE" and filed on Aug. 24, 2020, which are expressly incorporated by reference herein in their entirety.

TECHNICAL FIELD

The present disclosure relates generally to communication systems, and more particularly, to a configuration to update sounding reference signal (SRS) trigger list configurations using medium access control (MAC) control element (CE) (MAC-CE).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a base station. The device may be a processor and/or a modem at a base station or the base station itself. The apparatus transmits, to a user equipment (UE), a sounding reference signal (SRS) resource set trigger list configuration via radio resource control (RRC) signaling. The apparatus transmits, to the UE, an updated trigger list value via MAC-CE to update the SRS resource set trigger list configuration. A trigger state of at least one SRS resource set is updated based on the updated trigger list value. The apparatus receives, from the UE, at least one SRS based on the updated SRS resource set trigger list configuration.

In an aspect of the disclosure, a method, a computer-readable medium, and an apparatus are provided. The apparatus may be a device at a UE. The device may be a processor and/or a modem at a UE or the UE itself. The apparatus receives, from a base station, an SRS resource set trigger list configuration via RRC signaling. The apparatus receives, from the base station, an updated trigger list value via MAC-CE to update the SRS resource set trigger list configuration. A trigger state of at least one SRS resource set is updated based on the updated trigger list value. The apparatus transmits, to the base station, at least one SRS based on the updated SRS resource set trigger list configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 illustrates an example of an SRS resource configuration.

FIG. 6 illustrates an example of SRS triggering.

FIG. 8 is a call flow diagram of signaling between a UE and a base station.

FIG. 9 is a flowchart of a method of wireless communication.

FIG. 10 is a flowchart of a method of wireless communication.

FIG. 12 is a flowchart of a method of wireless communication.

DETAILED DESCRIPTION

Figure 1:
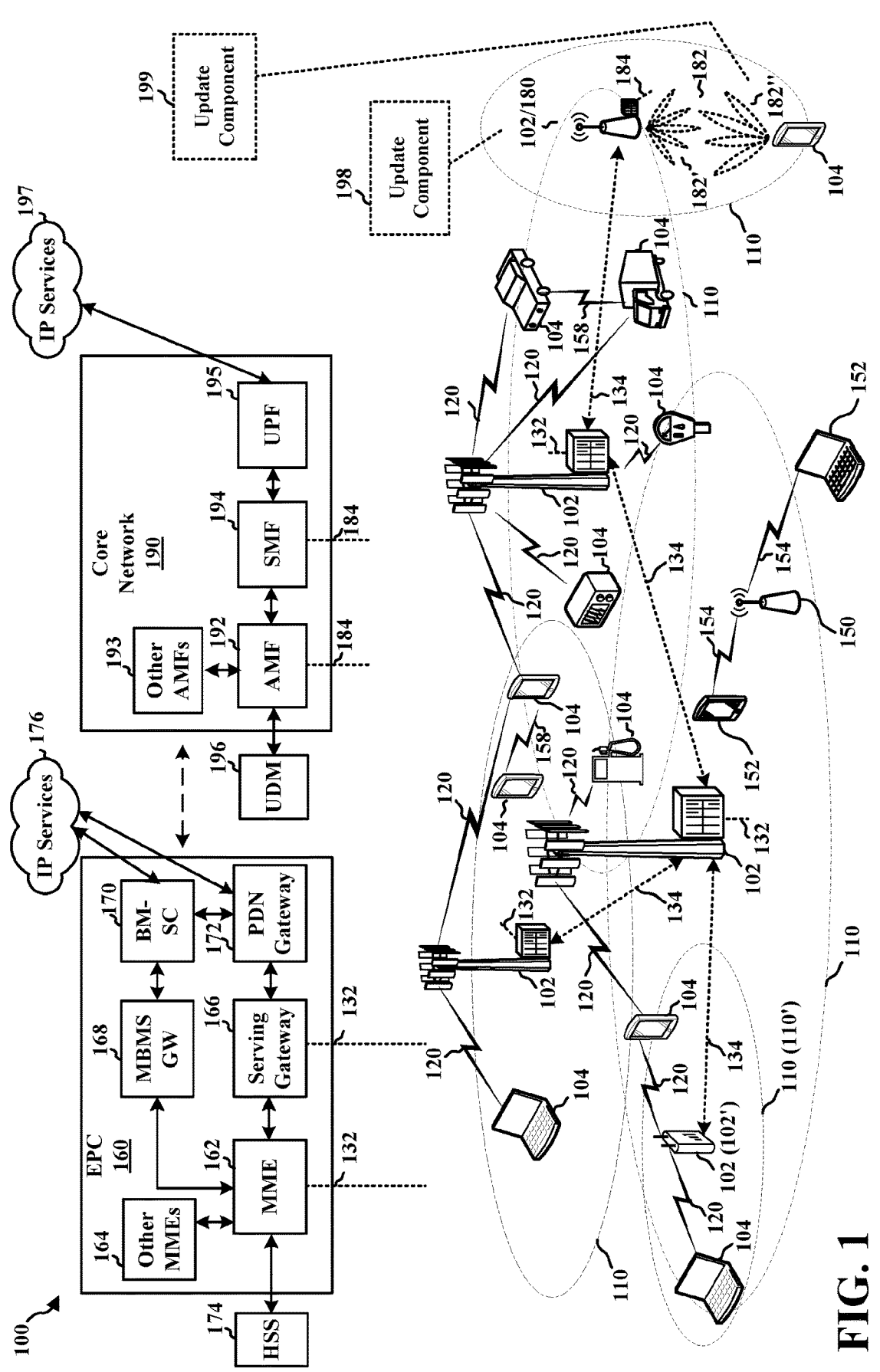
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the base station 180 may be configured to update an SRS resource set trigger list configuration using MAC-CE. For example, the base station 180 may comprise an update component 198 configured to transmit an updated trigger list value via MAC-CE to update an SRS resource set trigger list configuration. The base station 180 may transmit, to a UE 104, an SRS resource set trigger list configuration via RRC signaling. The base station 180 may transmit, to the UE 104, an updated trigger list value via MAC-CE to update the SRS resource set trigger list configuration. A trigger state of at least one SRS resource set is updated based on the updated trigger list value. The base station 180 may receive, from the UE 104, at least one SRS based on the updated SRS resource set trigger list configuration.

Referring again to FIG. 1, in certain aspects, the UE 104 may be configured to update an SRS resource set trigger list configuration using MAC-CE. For example, the UE 104 may comprise an update component 199 configured to receive an updated trigger list value via MAC-CE to update an SRS resource set trigger list configuration. The UE 104 may receive, from a base station 180, an SRS resource set trigger list configuration via RRC signaling. The UE 104 may receive, from the base station 180, an updated trigger list value via MAC-CE to update the SRS resource set trigger list configuration. A trigger state of at least one SRS resource set is updated based on the updated trigger list value. The UE 104 may transmit, to the base station 180, at least one SRS based on the updated SRS resource set trigger list configuration.

Although the following description may be focused on 5G NR, the concepts described herein may be applicable to other similar areas, such as LTE, LTE-A, CDMA, GSM, and other wireless technologies.

Figures 2A, 2B, 2C, 2D:
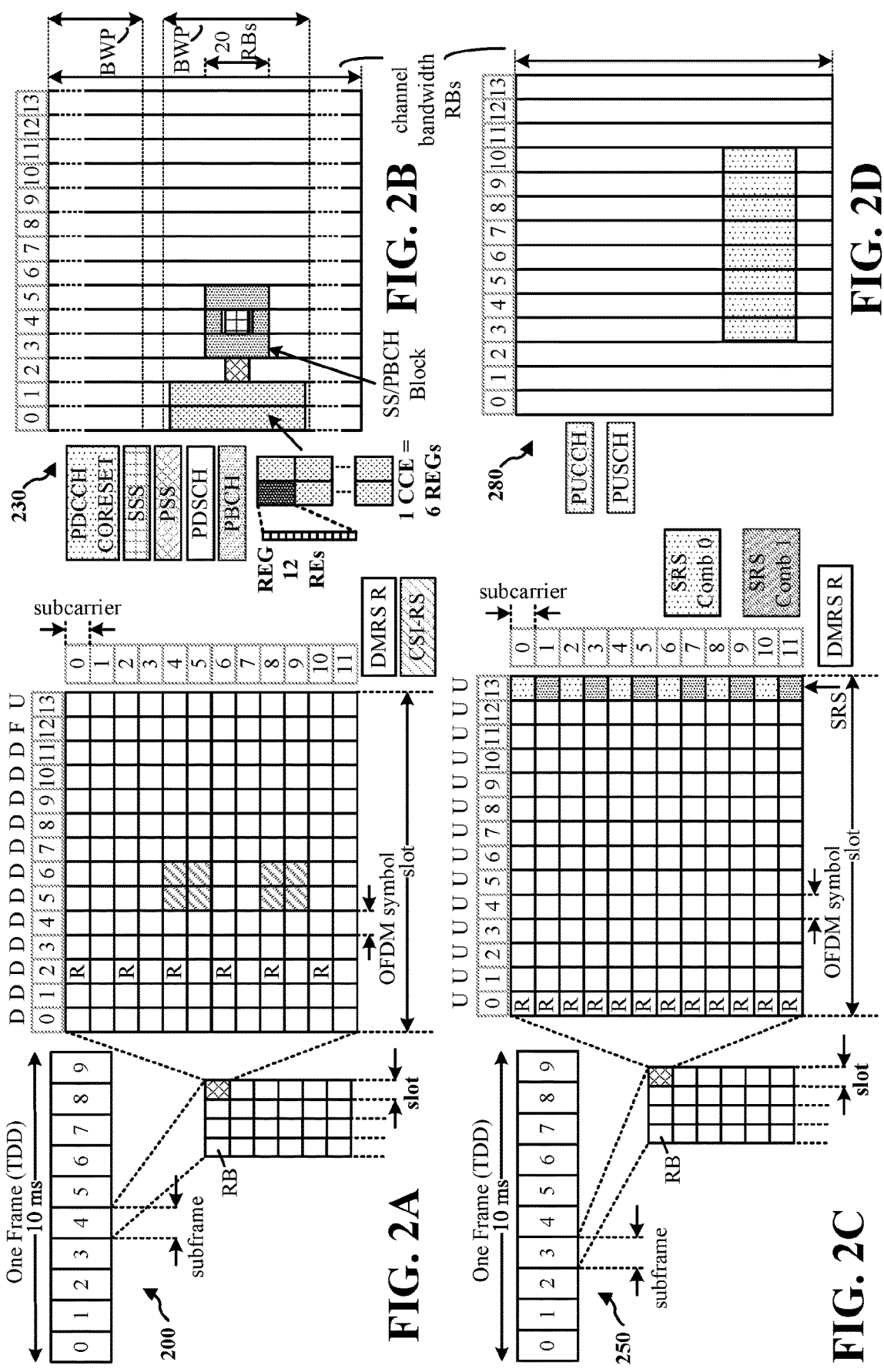
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| | SCS | |
| μ | $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
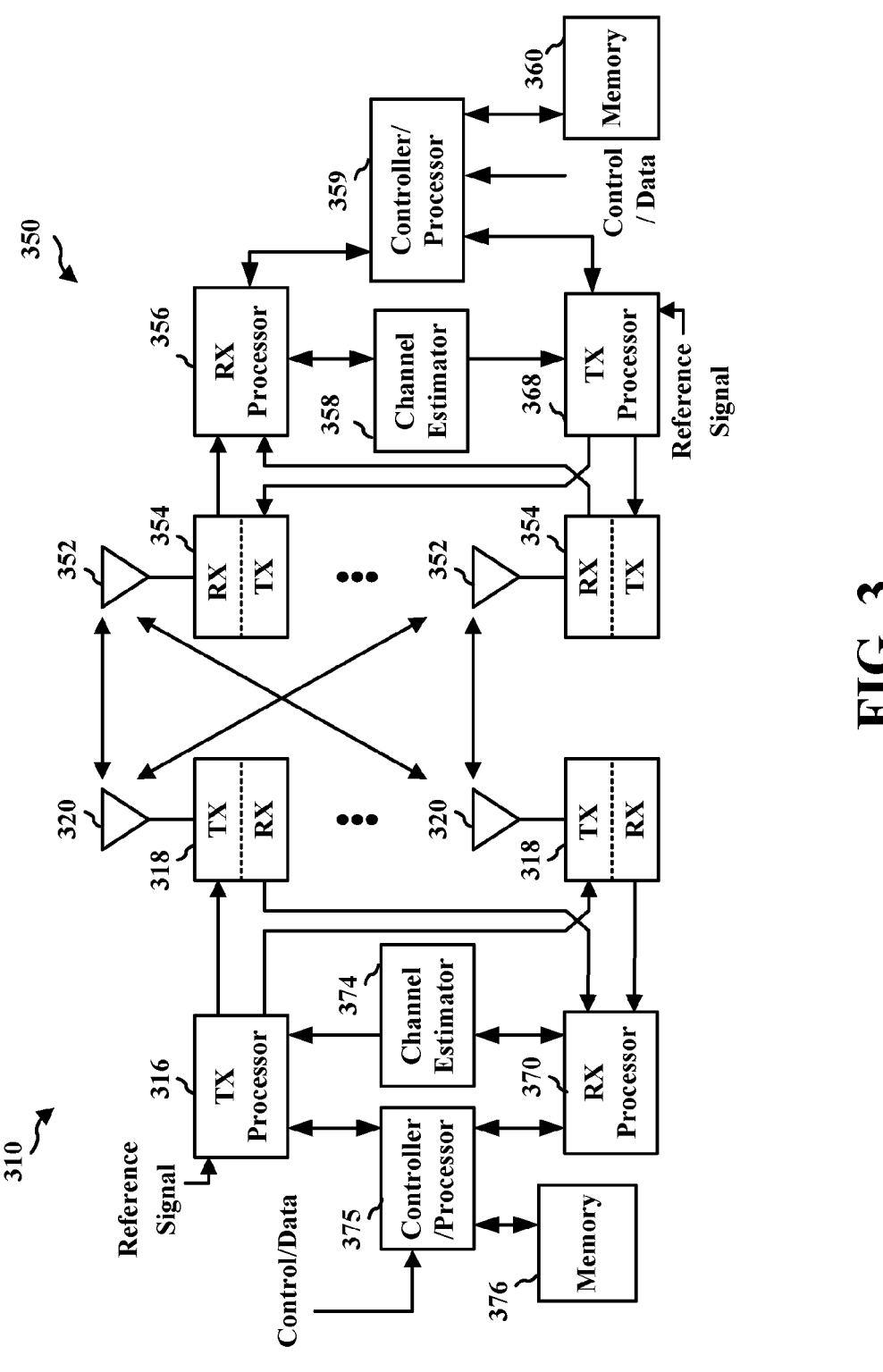
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

In wireless communications, in order to estimate uplink channels a UE may transmit SRS. Some wireless systems, such as but not limited to 5G NR, may support SRS resources that span 1, 2, or 4 adjacent symbols with up to 4 ports per SRS resource. The ports of an SRS resource are sounded in each symbol. However, an SRS is transmitted in the last 6 symbols (e.g., 402) of a slot, for example, as shown in diagram 400 of FIG. 4. In addition, an SRS is transmitted after a PUSCH in the slot.

Figure 5:
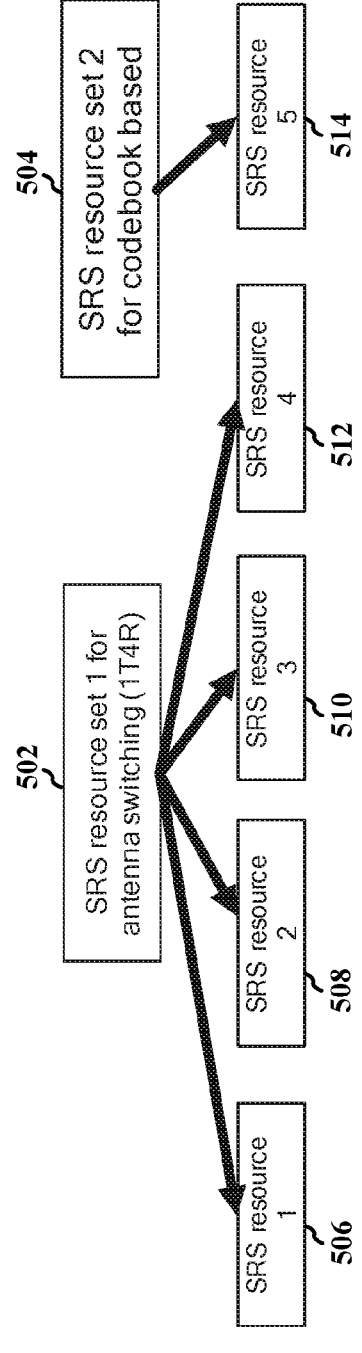
FIG. 5 illustrates an example of SRS resource sets and sets of SRS resources.

FIG. 5 illustrates an example 500 of SRS resource sets 502, 504 and sets of SRS resources 506, 508, 510, 512, 514. An SRS resource set (e.g., 502, 504) may comprise one or more sets of SRS resources (e.g., 506, 508, 510, 512, 514)

transmitted by a UE. In some instances, an SRS resource set may be transmitted aperiodic (DCI-signaled), semi-persistent, or periodic. In some instances, a UE may be configured with multiple resources, which may be grouped in an SRS resource set based on the use case (e.g., antenna switching, codebook-based, non-codebook based, beam management, etc.).

Each aperiodic SRS resource set may have one or more trigger states. DCI may trigger SRS resource sets according to the trigger states, as shown at 608 in example 600 of FIG. 6. The triggering of SRS resource sets may be as indicated in the following tables:

TABLE 1

| 1 bit SRS request in PCI format 0__2 and PCI format 1__2 | |
| --- | --- |
| Value of SRS request field | Triggered aperiodic SRS resource set(s) for DCI format 0__2 and 1__2 |
| 0 | No aperiodic SRS resource set triggered |
| 1 | SRS resource set(s) configured with higher layer parameter aperiodicSRS-ResourceTrigger set to 1 or an entry in aperiodicSRS-ResourceTriggerList set to 1 |

TABLE 2

| | SRS Request | |
| --- | --- | --- |
| Value of SRS request field | Triggered aperiodic SRS resource set(s) for DCI format 0__1, 0__2, 1__1, 1__2, and 2__3 configured with higher layer parameter srs-TPC-PDCCH-Group set to 'typeB' | Triggered aperiodic SRS resource set(s) for DCI format 2__3 configured with higher layer parameter srs-TPC-PDCCH-Group set to 'typeA' |
| 00 | No aperiodic SRS resource set triggered | No aperiodic SRS resource set triggered |
| 01 | SRS resource set(s) configured by SRS-ResourceSet with higher layer parameter aperiodicSRS-ResourceTrigger set to 1 or an entry in aperiodicSRS-ResourceTriggerList set to 1 SRS resource set(s) configured by SRS-PosResourceSet with an entry in aperiodicSRS-ResourceTriggerList set to 1 when triggered by DCI formats 0__1, 0__2, 1__1 and 1__2 | SRS resource set(s) configured with higher layer parameter usage in SRS-ResourceSet set to 'antennaSwitching' and resourceType in SRS-ResourceSet set to 'aperiodic' for a 1$^{st}$ set of serving cells configured by higher layers |
| 10 | SRS resource set(s) configured by SRS-ResourceSet with higher layer parameter aperiodicSRS-ResourceTrigger set to 2 or an entry in aperiodicSRS-ResourceTriggerList set to 2 SRS resource set(s) configured by SRS-PosResourceSet with an entry in aperiodicSRS-ResourceTriggerList set to 2 when triggered by DCI formats 0__1, 0__2, 1__1 and 1__2 | SRS resource set(s) configured with higher layer parameter usage in SRS-ResourceSet set to 'antennaSwitching' and resourceType in SRS-ResourceSet set to 'aperiodic' for a 2$^{nd}$ set of serving cells configured by higher layers |
| 11 | SRS resource set(s) configured by SRS-ResourceSet with higher layer parameter aperiodicSRS-ResourceTrigger set to 3 or an entry in aperiodicSRS-ResourceTriggerList set to 3 SRS resource set(s) configured by SRS-PosResourceSet with an entry in aperiodicSRS-ResourceTriggerList set to 3 when triggered by DCI formats 0__1, 0__2, 1__1 and 1__2 | SRS resource set(s) configured with higher layer parameter usage in SRS-ResourceSet set to 'antennaSwitching' and resourceType in SRS-ResourceSet set to 'aperiodic' for a 3$^{rd}$ set of serving cells configured by higher layers |

FIG. 6 illustrates an example 600 of SRS triggering. The example 600 comprises multiple SRS resource sets 602, 604, 606. The SRS resource sets 602 may correspond to a trigger state of 1. The SRS resource sets 604 may correspond to a trigger state of 2, and SRS resource sets 606 may correspond to a trigger state of 3. In some instances, SRS resource sets may overlap one or more of the other SRS resource sets. Each SRS resource set may have one slot offset for triggering, which may not be flexible in multiple UE cases.

Aspects presented herein provide a configuration to update SRS trigger list configurations using MAC-CE. MAC-CE may be used to determine which SRS resource sets will be triggered by updating the trigger list. Trigger lists may be configured by RRC signaling, while the configuration may allow for MAC-CE to update the trigger list value (e.g., aperiodicSRS-ResourceTrigger or aperiodicSRS-ResourceTriggerList) for SRS resource sets.

Figure 7:
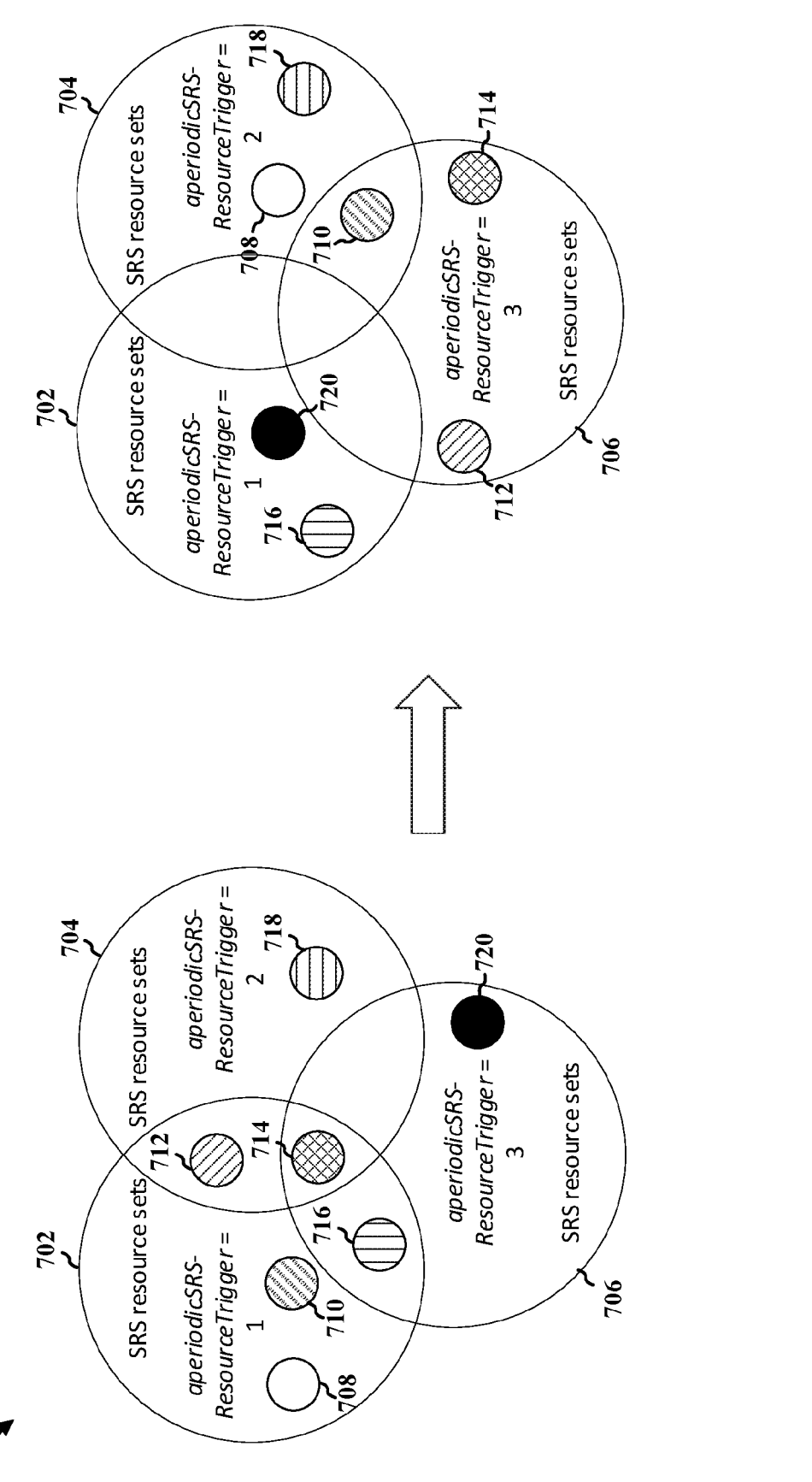
FIG. 7 illustrates an example of an updated trigger list.

In some aspects, MAC-CE may indicate the SRS resource set ID together with the updated trigger list. For example, with reference to the example 700 of FIG. 7, the SRS resource sets 702, 704, and 706 may have one or more SRS resource set IDs (e.g., 708, 710, 712, 714, 716, 718, 720). After receipt of the MAC-CE, the trigger value of the SRS resource set IDs 708, 710, 712, 714, 716, 718, 720 may be updated to indicate the updated trigger value. For example, SRS resource set ID 708 may be originally configured to have a trigger state or value of 1 and fall within SRS resource set 702. The MAC-CE may update the trigger state or value of the SRS resource set ID 708 such that the updated trigger state or value of the SRS resource set ID 708 is 2, and does not have the trigger state or value of 1. In some instances, one or more SRS resource set IDs may be updated, while in some instances, one or more SRS resource set IDs may be removed due to the MAC-CE.

In some instances, a bit map may be used together with the SRS resource set ID to correspond with a trigger list value. For example, for a maximum trigger state equal to 3, the bit 100 may correspond to a trigger state or value of 1 (e.g., aperiodicSRS-ResourceTrigger), or only 1 in a trigger list (e.g., aperiodicSRS-ResourceTriggerList). The bit 001 may correspond to a trigger state of value of 3, or only 3 in a trigger list. The bit 011 may correspond to 2 and 3 in a trigger list. In some instances, multiple SRS resource set may be updated by one MAC-CE or by multiple MAC-CE commands.

In some aspects, one or more SRS resource sets may be added to one trigger state. All the SRS resource sets may add the new trigger state into their trigger list (e.g., aperiodicSRS-ResourceTriggerList), which may include a trigger state plus a list of SRS resource sets IDs. In some aspects, one or more SRS resource sets may be removed from a trigger state. In such instances, all the SRS resource sets may remove the new trigger state into their trigger list (e.g., aperiodicSRS-ResourceTriggerList), which may include a trigger state plus a list of SRS resource sets IDs.

In some aspects, the MAC-CE may be configured to update the trigger list along with some other parameters. As discussed above, the trigger list may be initially configured by RRC. However, a MAC-CE may be configured to update the trigger list value along with other parameters. For example, MAC-CE may indicate the SRS resource set ID together with SRS resource set parameters. The SRS resource set parameters may include a slot offset, associated CSI-RS resource, power control parameters, path loss reference signal, or a spatial filter for the SRS resources within the set. Multiple SRS resource sets may be updated by one MAC-CE or by multiple MAC-CE commands.

In some aspects, when a UE receives a MAC-CE update command and when a HARQ-ACK corresponding to a PDSCH carrying the update command is transmitted in a slot n, the corresponding actions and the UE assumptions on updating the trigger list may be applied for SRS transmission starting from the first slot that is after slot $$n + 3N_{slot}^{subframe,\mu}(3 \text{ ms}).$$

After receiving the DCI triggering, and the received MAC-CE, but prior to the updated configuration becoming effective, the UE may follow the initial configuration configured by RRC signaling to transmit SRS.

In some aspects, instructions for a BWP switch may be received along with the SRS update. The UE, after receiving the MAC-CE update, and the DCI triggering, if the DCI indicates a change of the active BWP, the UE may not utilize the MAC-CE to update the SRS if the MAC-CE does not include a BWP identifier associated with a corresponding BWP. In such instances, the UE may ignore the MAC-CE update and not update the SRS, and change the active BWP without updating SRS. In some aspects, for example if the MAC-CE does include a BWP identifier (ID), the UE utilizes the MAC-CE to update SRS, and changes the active BWP based on the instructions within the DCI.

In some aspects, carrier components may also be updated based on the MAC-CE. For example, the MAC-CE may include one or more CC IDs, such that one MAC-CE command may be used to change the trigger list for all CCs. In some aspects, the MAC-CE may update a trigger list of a plurality of CCs. In some aspects, the MAC-CE may be used for one CC where PDCCH or PDSCH is transmitted.

In some aspects, SRS for positioning may be updated in a similar manner. For example, a UE may receive, from a base station, a configuration for positioning reference signals via RRC signaling. The UE may receive an updated trigger list value via MAC-CE to update the configuration for positioning reference signals. The UE may transmit at least one positioning reference signal based on the updated trigger list value.

FIG. 8 is a call flow diagram 800 of signaling between a UE 802 and a base station 804. The base station 804 may be configured to provide a cell. The UE 802 may be configured to communicate with the base station 804. For example, in the context of FIG. 1, the base station 804 may correspond to base station 102/180 and, accordingly, the cell may include a geographic coverage area 110 in which communication coverage is provided and/or small cell 102' having a coverage area 110'. Further, a UE 802 may correspond to at least UE 104. In another example, in the context of FIG. 3, the base station 804 may correspond to base station 310 and the UE 802 may correspond to UE 350.

As illustrated at 806, the base station 804 may transmit an SRS resource set trigger list configuration. The base station 804 may transmit the SRS resource set trigger list configuration to a UE 802. The UE 802 may receive the SRS resource set trigger list configuration from a base station 804. The base station 804 may transmit the SRS resource set trigger list configuration to the UE 802 via RRC signaling.

As illustrated at 808, the base station 804 may transmit an updated trigger list value. The base station 804 may transmit the updated trigger list value to the UE 802. The UE 802 may receive the updated trigger list value from the base station 804. The base station 804 may transmit the updated trigger list value to the UE 802 via MAC-CE to update the SRS resource set trigger list configuration. A trigger state of the at least one SRS resource set may be updated based on the updated trigger list value. In some aspects, the MAC-CE may include an SRS resource set identifier. The updated trigger list value may correspond to an SRS resource set based on the SRS resource set identifier. The SRS resource set identifier may be utilized with a bit map to correspond with the updated trigger list value. In some aspects, a plurality of SRS resource sets may be updated based on the updated trigger list value. A respective trigger state of each of the plurality of SRS resource sets is updated based on the MAC-CE. In some aspects, one or more SRS resource sets are added to the trigger state based on the updated trigger list value. In some aspects, one or more SRS resource set are removed from the trigger state based on the updated trigger list value. In some aspects, the MAC-CE may be further configured to update SRS resource set parameters. The updated SRS resource set parameters may include at least one of a slot offset for each SRS resource set or a start position for each SRS resource. The MAC-CE may include an SRS resource set identifier and the updated SRS resource set parameters. In some aspects, the updated SRS resource set parameters includes at least one of a slot offset, associated channel state information reference signals (CSI-RS) resource, power control parameters, path loss reference signal, or spatial filters for SRS resources within the SRS resource set. In some aspects, the MAC-CE may include one or more carrier component (CC) identifiers. In some aspects, the MAC-CE may update a trigger list of a plurality of CCs. In some aspects, the MAC-CE may update a trigger list for one CC.

As illustrated at 810, the base station 804 the base station may transmit downlink control information (DCI) to the UE 802. The base station 804 may transmit DCI to the UE 802 to trigger the at least one SRS resource set. The UE 802 may receive DCI from the base station 804 to trigger the at least one SRS resource set. In some aspects, the DCI may further include instructions for the UE 802 to change an active bandwidth part (BWP). In some aspects, the UE 802 does not utilize the MAC-CE to update the SRS resource set trigger list configuration if the MAC-CE does not include a BWP identifier associated with a corresponding BWP. The active BWP may be changed without updating the SRS resource set trigger list configuration. In some aspects, the UE 802 may utilize the MAC-CE to update the SRS resource set trigger list configuration and may change the active BWP based on the instructions within the DCI, if the MAC-CE includes a BWP identifier associated with a corresponding BWP.

As illustrated at 812, the UE 802 may transmit at least one SRS. The UE 802 may transmit the at least one SRS based on the SRS resource set trigger list configuration prior to the updated SRS resource set trigger list configuration being enabled. The base station 804 may receive the at least one SRS based on the SRS resource set trigger list configuration prior to the updated SRS resource set trigger list configuration being enabled.

As illustrated at 814, the UE 802 may transmit at least one SRS based on the updated SRS resource set trigger list configuration. The UE 802 may transmit the at least one SRS to the base station 804 based on the updated SRS resource set trigger list configuration. The base station 804 may receive the at least one SRS based on the updated SRS resource set trigger list configuration from the UE 802.

As illustrated at 816, the base station 804 may transmit a configuration for positioning reference signals. The base station 804 may transmit the configuration for the positioning reference signals to the UE 802. The UE 802 may receive the configuration for the positioning reference signals from the base station 804. The base station 804 may transmit the configuration for the positioning reference signals via RRC signaling.

As illustrated at 818, the base station 804 may transmit an updated trigger list value to update the configuration for positioning reference signals. The base station 804 may transmit the updated trigger list value to update the configuration for positioning reference signals to the UE 802. The UE 802 may receive the updated trigger list value to update the configuration for positioning reference signals from the base station 804. The base station 804 may transmit the updated trigger list value to update the configuration for positioning reference signals via MAC-CE.

As illustrated at 820, the UE 802 may transmit at least one positioning reference signal. The UE 802 may transmit the at least one positioning reference signal to the base station 804. The UE 802 may transmit the at least one positioning reference signal to the base station 804 based on the updated trigger list value. The base station 804 may receive the at least one positioning reference signal from the UE 802 based on the updated trigger list value.

FIG. 9 is a flowchart 900 of a method of wireless communication. The method may be performed by a base station or a component of a base station (e.g., the base station 102/180; the apparatus 1102; the baseband unit 1104, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow for an SRS resource set trigger list configuration to be updated using MAC-CE.

At 902, the base station may transmit an SRS resource set trigger list configuration. For example, 902 may be performed by configuration component 1140 of apparatus 1102. The base station may transmit the SRS resource set trigger list configuration to a UE. The base station may transmit the SRS resource set trigger list configuration to the UE via RRC signaling. In the context of FIG. 8, the base station 804, at 806, may transmit an SRS resource set trigger list configuration.

At 904, the base station may transmit an updated trigger list value. For example, 904 may be performed by update component 1142 of apparatus 1102. The base station may transmit the updated trigger list value to the UE. The base station may transmit the updated trigger list value to the UE via MAC-CE to update the SRS resource set trigger list configuration. A trigger state of the at least one SRS resource set may be updated based on the updated trigger list value. In some aspects, the MAC-CE may include an SRS resource set identifier. The updated trigger list value may correspond to an SRS resource set based on the SRS resource set identifier. The SRS resource set identifier may be utilized with a bit map to correspond with the updated trigger list value. In some aspects, a plurality of SRS resource sets may be updated based on the updated trigger list value. A respective trigger state of each of the plurality of SRS resource sets is updated based on the MAC-CE. In some aspects, one or more SRS resource sets are added to the trigger state based on the updated trigger list value. In some aspects, one or more SRS resource set are removed from the trigger state based on the updated trigger list value. In some aspects, the MAC-CE may be further configured to update SRS resource set parameters. The updated SRS resource set parameters may include at least one of a slot offset for each SRS resource set or a start position for each SRS resource. The MAC-CE may include an SRS resource set identifier and the updated SRS resource set parameters. In some aspects, the updated SRS resource set parameters includes at least one of a slot offset, associated CSI-RS resource, power control parameters, path loss reference signal, or spatial filters for SRS resources within the SRS resource set. In some aspects, the MAC-CE may include one or more CC identifiers. In some aspects, the MAC-CE may update a trigger list of a plurality of CCs. In some aspects, the MAC-CE may update a trigger list for one CC. In the context of FIG. 8, the base station 804, at 808, may transmit an updated trigger list value.

At 906, the base station may receive at least one SRS based on the updated SRS resource set trigger list configuration. For example, 906 may be performed by SRS component 1046 of apparatus 1002. The base station may receive the at least one SRS based on the updated SRS resource set trigger list configuration from the UE. In the context of FIG. 8, the base station 804, at 814, may receive at least one SRS based on the updated SRS resource set trigger list configuration.

FIG. 10 is a flowchart 1000 of a method of wireless communication. The method may be performed by a base station or a component of a base station (e.g., the base station 102/180, 804; the apparatus 1102; the baseband unit 1104, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow for an SRS resource set trigger list configuration to be updated using MAC-CE.

At 1002, the base station may transmit an SRS resource set trigger list configuration. For example, 1002 may be performed by configuration component 1140 of apparatus 1102. The base station may transmit the SRS resource set trigger list configuration to a UE. The base station may transmit the SRS resource set trigger list configuration to the UE via RRC signaling. In the context of FIG. 8, the base station 804, at 806, may transmit an SRS resource set trigger list configuration.

At 1004, the base station may transmit an updated trigger list value. For example, 1004 may be performed by update component 1142 of apparatus 1102. The base station may transmit the updated trigger list value to the UE. The base station may transmit the updated trigger list value to the UE via MAC-CE to update the SRS resource set trigger list configuration. A trigger state of the at least one SRS resource set may be updated based on the updated trigger list value. In some aspects, the MAC-CE may include an SRS resource set identifier. The updated trigger list value may correspond to an SRS resource set based on the SRS resource set identifier. The SRS resource set identifier may be utilized with a bit map to correspond with the updated trigger list value. In some aspects, a plurality of SRS resource sets may be updated based on the updated trigger list value. A respective trigger state of each of the plurality of SRS resource sets is updated based on the MAC-CE. In some aspects, one or more SRS resource sets are added to the trigger state based on the updated trigger list value. In some aspects, one or more SRS resource set are removed from the trigger state based on the updated trigger list value. In some aspects, the MAC-CE may be further configured to update SRS resource set parameters. The updated SRS resource set parameters may include at least one of a slot offset for each SRS resource set or a start position for each SRS resource. The MAC-CE may include an SRS resource set identifier and the updated SRS resource set parameters. In some aspects, the updated SRS resource set parameters includes at least one of a slot offset, associated CSI-RS resource, power control parameters, path loss reference signal, or spatial filters for SRS resources within the SRS resource set. In some aspects, the MAC-CE may include one or more CC identifiers. In some aspects, the MAC-CE may update a trigger list of a plurality of CCs. In some aspects, the MAC-CE may update a trigger list for one CC. In the context of FIG. 8, the base station 804, at 808, may transmit an updated trigger list value.

At 1006, the base station may transmit DCI to the UE. For example, 1006 may be performed by DCI component 1144 of apparatus 1102. The base station may transmit DCI to the UE to trigger the at least one SRS resource set. In the context of FIG. 8, the base station 804, at 810, may transmit DCI to the UE 802.

At 1008, the base station may receive at least one SRS. For example, 1008 may be performed by SRS component 1146 of apparatus 1102. The base station may receive the at least one SRS based on the SRS resource set trigger list configuration prior to the updated SRS resource set trigger list configuration being enabled. In the context of FIG. 8, the base station 804, at 812, may receive at least one SRS.

At 1010, the base station may transmit DCI to the UE to trigger the at least one SRS resource set. For example, 1010 may be performed by DCI component 1144 of apparatus 1102. The DCI may further include instructions for the UE to change an active BWP. In some aspects, the UE does not utilize the MAC-CE to update the SRS resource set trigger list configuration if the MAC-CE does not include a BWP identifier associated with a corresponding BWP. The active BWP may be changed without updating the SRS resource set trigger list configuration. In some aspects, the UE may utilize the MAC-CE to update the SRS resource set trigger list configuration and may change the active BWP based on the instructions within the DCI, if the MAC-CE includes a BWP identifier associated with a corresponding BWP. In the context of FIG. 8, the base station 804, at 810, may transmit DCI to the UE to trigger the at least one SRS resource set.

At 1012, the base station may receive at least one SRS based on the updated SRS resource set trigger list configuration. For example, 1012 may be performed by SRS component 1146 of apparatus 1102. The base station may receive the at least one SRS based on the updated SRS resource set trigger list configuration from the UE. In the context of FIG. 8, the base station 804, at 814, may receive at least one SRS based on the updated SRS resource set trigger list configuration.

At 1014, the base station may transmit a configuration for positioning reference signals. For example, 1014 may be performed by configuration component 1140 of apparatus 1102. The base station may transmit the configuration for the positioning reference signals to the UE. The base station may transmit the configuration for the positioning reference signals via RRC signaling. In the context of FIG. 8, the base station 804, at 816, may transmit a configuration for positioning reference signals.

At 1016, the base station may transmit an updated trigger list value to update the configuration for positioning reference signals. For example, 1016 may be performed by update component 1142 of apparatus 1102. The base station may transmit the updated trigger list value to update the configuration for positioning reference signals to the UE. The base station may transmit the updated trigger list value to update the configuration for positioning reference signals via MAC-CE. In the context of FIG. 8, the base station 804, at 818, may transmit an updated trigger list value to update the configuration for positioning reference signals.

At 1018, the base station may receive at least one positioning reference signal. For example, 1018 may be performed by position component 1148 of apparatus 1102. The base station may receive the at least one positioning reference signal from the UE. The base station may receive the at least one positioning reference signal from the UE based on the updated trigger list value. In the context of FIG. 8, the base station 804, at 820, may receive at least one positioning reference signal.

Figure 11:
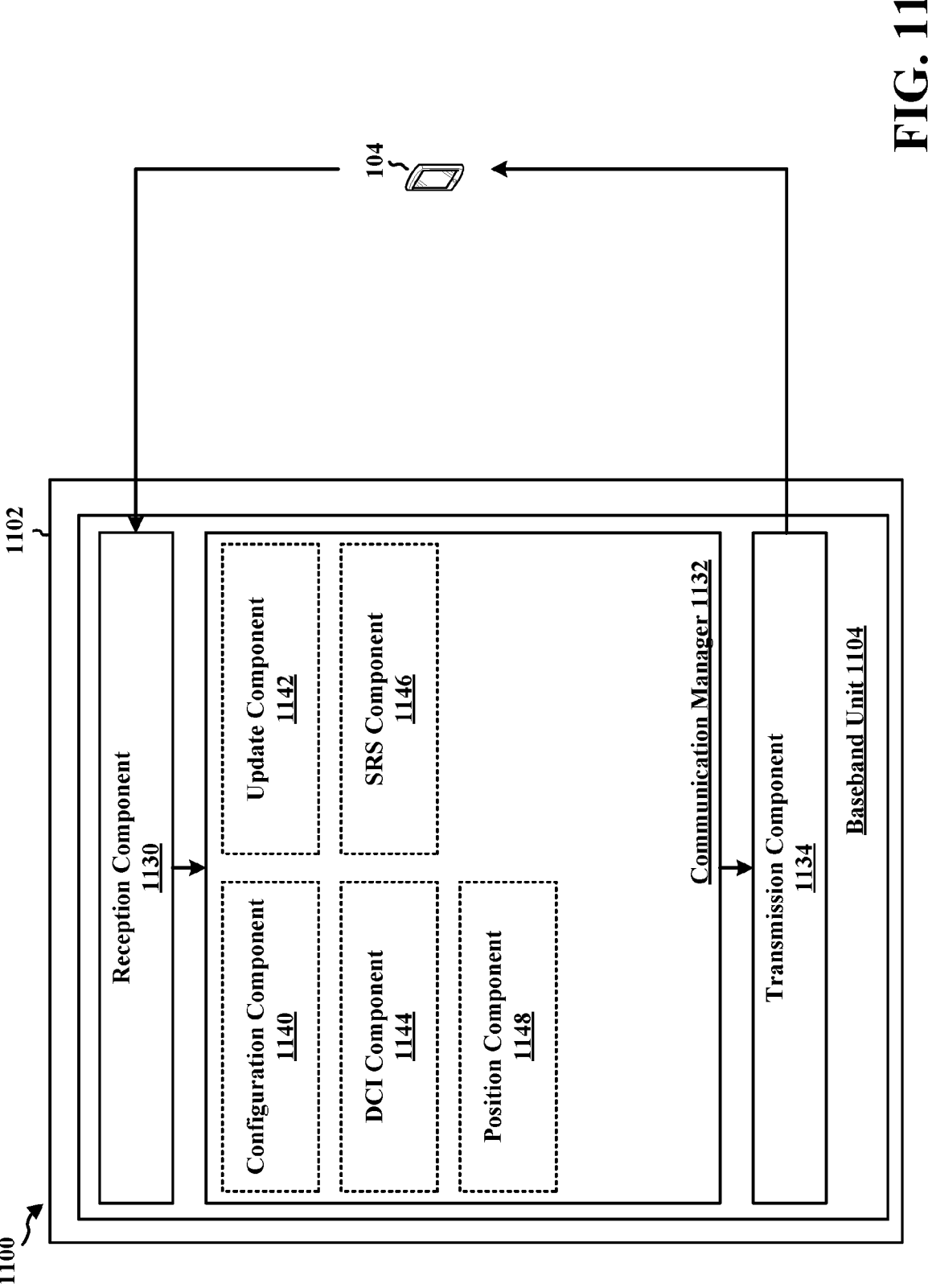
FIG. 11 is a diagram illustrating an example of a hardware implementation for an example apparatus.

FIG. 11 is a diagram 1100 illustrating an example of a hardware implementation for an apparatus 1102. The apparatus 1102 may be a base station, a component of a base station, or may implement base station functionality. In some aspects, the apparatus 1102 may include a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes a configuration component 1140 that may transmit an SRS resource set trigger list configuration, e.g., as described in connection with 902 of FIG. 9 or 1002 of FIG. 10. The configuration component 1140 may be configured to transmit a configuration for positioning reference signals, e.g., as described in connection with 1014 of FIG. 10. The communication manager 1132 further includes an update component 1142 that may transmit an updated trigger list value, e.g., as described in connection with 904 of FIG. 9 or 1004 of FIG. 10. The update component 1142 may be configured to may transmit an updated trigger list value to update the configuration for positioning reference signals, e.g., as described in connection with 1016 of FIG. 10. The communication manager 1132 further includes a DCI component 1144 that may transmit DCI to the UE, e.g., as described in connection with 1006 of FIG. 10. The DCI component may be configured to transmit DCI to the UE to trigger the at least one SRS resource set, e.g., as described in connection with 1010 of FIG. 10. The communication manager 1132 further includes an SRS component 1146 that may receive at least one SRS, e.g., as described in connection with 1008 of FIG. 10. The SRS component 1146 may be configured to receive at least one SRS based on the updated SRS resource set trigger list configuration, e.g., as described in connection with 904 of FIG. 9 or 1012 of FIG. 10. The communication manager 1132 further includes a position component 1148 that may receive at least one positioning reference signal, e.g., as described in connection with 1018 of FIG. 10.

The apparatus may include additional components that perform each of the blocks of the algorithm in the flowcharts of FIG. 9 or 10. As such, each block in the flowcharts of FIG. 9 or 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, includes means for transmitting, to the UE, an SRS resource set trigger list configuration via RRC signaling. The apparatus includes means for transmitting, to the UE, an updated trigger list value via MAC-CE to update the SRS resource set trigger list configuration. A trigger state of at least one SRS resource set is updated based on the updated trigger list value. The apparatus includes means for receiving, from the UE, at least one SRS based on the updated SRS resource set trigger list configuration. The apparatus further includes means for transmitting, to the UE, DCI to trigger the at least one SRS resource set. The apparatus further includes means for receiving at least one SRS based on the SRS resource set trigger list configuration prior to the updated SRS resource set trigger list configuration being enabled. The apparatus further includes means for transmitting, to the UE, DCI to trigger the at least one SRS resource set. The DCI further includes instructions for the UE to change an active BWP. The apparatus further includes means for transmitting, to the UE, a configuration for positioning reference signals via RRC signaling. The apparatus further includes means for transmitting, to the UE, an updated trigger list value via MAC-CE to update the configuration for positioning reference signals. The apparatus further includes means for receiving, from the UE, at least one positioning reference signal based on the updated trigger list value. The means may be one or more of the components of the apparatus 1102 configured to perform the functions recited by the means. As described supra, the apparatus 1102 may include the TX Processor 316, the RX Processor 370, and the controller/processor 375. As such, in one configuration, the means may be the TX Processor 316, the RX Processor 370, and the controller/processor 375 configured to perform the functions recited by the means.

FIG. 12 is a flowchart 1200 of a method of wireless communication. The method may be performed by a UE or a component of a UE (e.g., the UE 104, 802; the apparatus 1402; the cellular baseband processor 1404, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow for an SRS resource set trigger list configuration to be updated using MAC-CE.

At 1202, the UE may receive an SRS resource set trigger list configuration. For example, 1202 may be performed by configuration component 1440 of apparatus 1402. The UE may receive the SRS resource set trigger list configuration from a base station. The UE may receive the SRS resource set trigger list configuration from the base station via RRC signaling. In the context of FIG. 8, the UE 802, at 806, may receive an SRS resource set trigger list configuration.

At 1204, the UE may receive an updated trigger list value. For example, 1204 may be performed by update component 1442 of apparatus 1402. The UE may receive the updated trigger list value from the base station. The UE may receive the update trigger list value from the base station via MAC-CE to update the SRS resource set trigger list configuration. A trigger state of the at least one SRS resource set may be updated based on the updated trigger list value. In some aspects, the MAC-CE may include an SRS resource set identifier. The updated trigger list value may correspond to an SRS resource set based on the SRS resource set identifier. The SRS resource set identifier may be utilized with a bit map to correspond with the updated trigger list value. In some aspects, a plurality of SRS resource sets may be updated based on the updated trigger list value. A respective trigger state of each of the plurality of SRS resource sets is updated based on the MAC-CE. In some aspects, one or more SRS resource sets are added to the trigger state based on the updated trigger list value. In some aspects, one or more SRS resource set are removed from the trigger state based on the updated trigger list value. In some aspects, the MAC-CE may be further configured to update SRS resource set parameters. The updated SRS resource set parameters may include at least one of a slot offset for each SRS resource set or a start position for each SRS resource. The MAC-CE may include an SRS resource set identifier and the updated SRS resource set parameters. In some aspects, the updated SRS resource set parameters includes at least one of a slot offset, associated CSI-RS resource, power control parameters, path loss reference signal, or spatial filters for SRS resources within the SRS resource set. In some aspects, the MAC-CE may include one or more CC identifiers. In some aspects, the MAC-CE may update a trigger list of a plurality of CCs. In some aspects, the MAC-CE may update a trigger list for one CC. In the context of FIG. 8, the UE 802, at 808, may receive an updated trigger list value.

At 1206, the UE may transmit at least one SRS based on the updated SRS resource set trigger list configuration. For example, 1212 may be performed by SRS component 1446 of apparatus 1402. The UE may transmit the at least one SRS to the base station based on the updated SRS resource set trigger list configuration. In the context of FIG. 8, the UE 802, at 814, may transmit at least one SRS based on the updated SRS resource set trigger list configuration.

Figure 13:
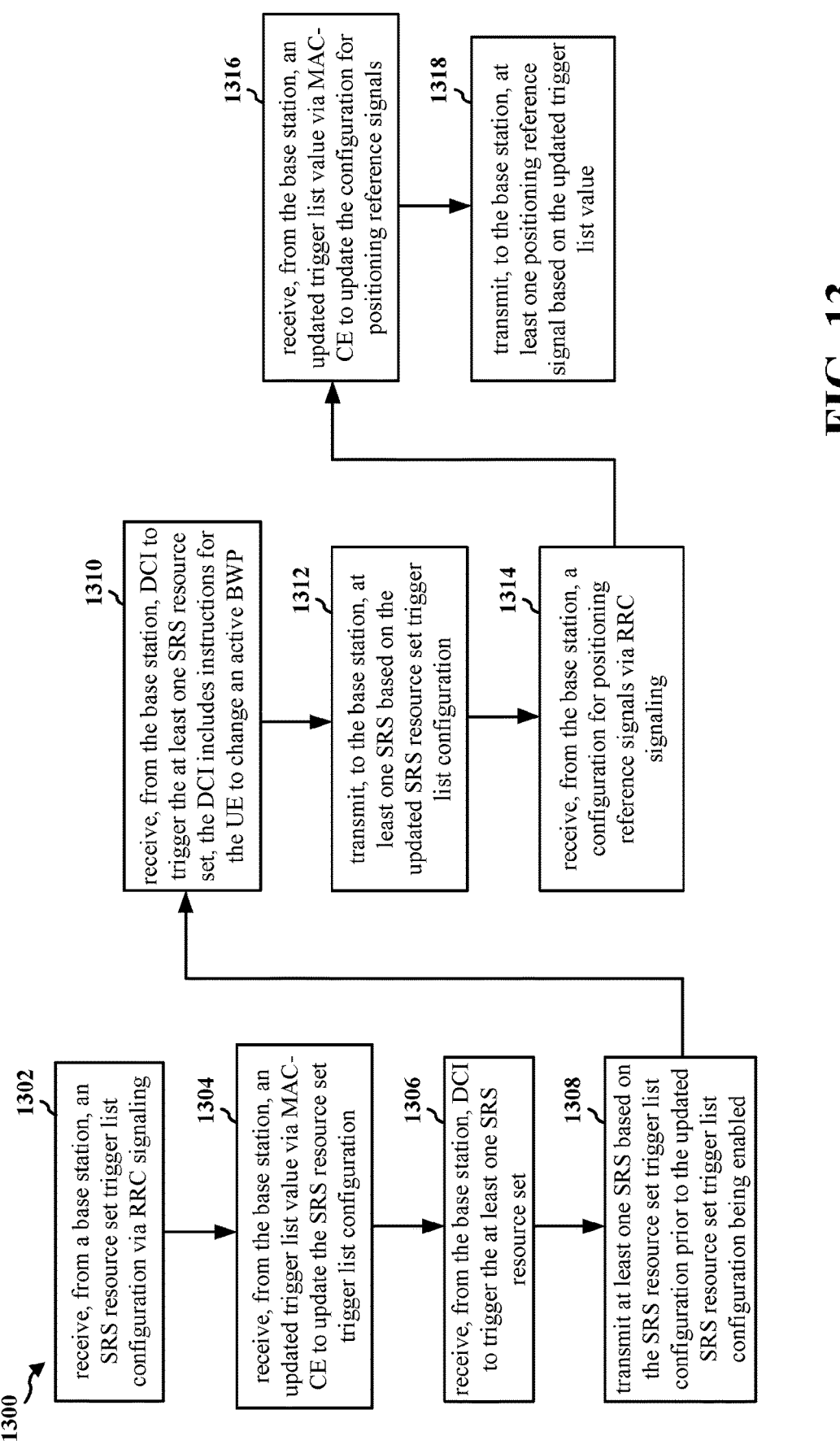
FIG. 13 is a flowchart of a method of wireless communication.

FIG. 13 is a flowchart 1300 of a method of wireless communication. The method may be performed by a UE or a component of a UE (e.g., the UE 104, 802; the apparatus 1402; the cellular baseband processor 1404, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow for an SRS resource set trigger list configuration to be updated using MAC-CE.

At 1302, the UE may receive an SRS resource set trigger list configuration. For example, 1302 may be performed by configuration component 1440 of apparatus 1402. The UE may receive the SRS resource set trigger list configuration from a base station. The UE may receive the SRS resource set trigger list configuration from the base station via RRC signaling. In the context of FIG. 8, the UE 802, at 806, may receive an SRS resource set trigger list configuration.

At 1304, the UE may receive an updated trigger list value. For example, 1304 may be performed by update component 1442 of apparatus 1402. The UE may receive the updated trigger list value from the base station. The UE may receive the update trigger list value from the base station via MAC-CE to update the SRS resource set trigger list configuration. A trigger state of the at least one SRS resource set may be updated based on the updated trigger list value. In some aspects, the MAC-CE may include an SRS resource set identifier. The updated trigger list value may correspond to an SRS resource set based on the SRS resource set identifier. The SRS resource set identifier may be utilized with a bit map to correspond with the updated trigger list value. In some aspects, a plurality of SRS resource sets may be updated based on the updated trigger list value. A respective trigger state of each of the plurality of SRS resource sets is updated based on the MAC-CE. In some aspects, one or more SRS resource sets are added to the trigger state based on the updated trigger list value. In some aspects, one or more SRS resource set are removed from the trigger state based on the updated trigger list value. In some aspects, the MAC-CE may be further configured to update SRS resource set parameters. The updated SRS resource set parameters may include at least one of a slot offset for each SRS resource set or a start position for each SRS resource. The MAC-CE may include an SRS resource set identifier and the updated SRS resource set parameters. In some aspects, the updated SRS resource set parameters includes at least one of a slot offset, associated CSI-RS resource, power control parameters, path loss reference signal, or spatial filters for SRS resources within the SRS resource set. In some aspects, the MAC-CE may include one or more CC identifiers. In some aspects, the MAC-CE may update a trigger list of a plurality of CCs. In some aspects, the MAC-CE may update a trigger list for one CC. In the context of FIG. 8, the UE 802, at 808, may receive an updated trigger list value.

At 1306, the UE may receive DCI from the base station. For example, 1306 may be performed by DCI component 1444 of apparatus 1402. The UE may receive DCI from the base station to trigger the at least one SRS resource set. In the context of FIG. 8, the UE 802, at 810, may receive DCI from the base station 804.

At 1308, the UE may transmit at least one SRS. For example, 1308 may be performed by SRS component 1446 of apparatus 1402. The UE may transmit the at least one SRS based on the SRS resource set trigger list configuration prior to the updated SRS resource set trigger list configuration being enabled. In the context of FIG. 8, the UE 802, at 812, may transmit at least one SRS.

At 1310, the UE may receive DCI from the base station to trigger the at least one SRS resource set. For example, 1310 may be performed by DCI component 1444 of apparatus 1402. The DCI may further include instructions for the UE to change an active bandwidth part (BWP). In some aspects, the UE does not utilize the MAC-CE to update the SRS resource set trigger list configuration if the MAC-CE does not include a BWP identifier associated with a corresponding BWP. The active BWP may be changed by the UE without updating the SRS resource set trigger list configuration. In some aspects, the UE may utilize the MAC-CE to update the SRS resource set trigger list configuration and may change the active BWP based on the instructions within the DCI, if the MAC-CE includes a BWP identifier associated with a corresponding BWP. In the context of FIG. 8, the UE 802, at 810, may receive DCI from the base station to trigger the at least one SRS resource set.

At 1312, the UE may transmit at least one SRS based on the updated SRS resource set trigger list configuration. For example, 1312 may be performed by SRS component 1446 of apparatus 1402. The UE may transmit the at least one SRS to the base station based on the updated SRS resource set trigger list configuration. In the context of FIG. 8, the UE 802, at 814, may transmit at least one SRS based on the updated SRS resource set trigger list configuration. In the context of FIG. 8, the UE 802, at 814, may transmit at least one SRS based on the updated SRS resource set trigger list configuration.

At 1314, the UE may receive a configuration for positioning reference signals. For example, 1314 may be performed by configuration component 1440 of apparatus 1402. The UE may receive the configuration for the positioning reference signals from the base station. The UE may receive the configuration for the positioning reference signals via RRC signaling. In the context of FIG. 8, the UE 802, at 816, may receive a configuration for positioning reference signals.

At 1316, the UE may receive an updated trigger list value to update the configuration for positioning reference signals. For example, 1316 may be performed by update component 1442 of apparatus 1402. The UE may receive the updated trigger list value to update the configuration for positioning reference signals from the base station. The UE may receive the updated trigger list value to update the configuration for positioning reference signals via MAC-CE. In the context of FIG. 8, the UE 802, at 818, may receive an updated trigger list value to update the configuration for positioning reference signals.

At 1318, the UE may transmit at least one positioning reference signal. For example, 1318 may be performed by position component 1448 of apparatus 1402. The UE may transmit the at least one positioning reference signal to the base station. The UE may transmit the at least one positioning reference signal from to the base station based on the updated trigger list value. In the context of FIG. 8, the UE 802, at 820, may transmit at least one positioning reference signal.

Figure 14:
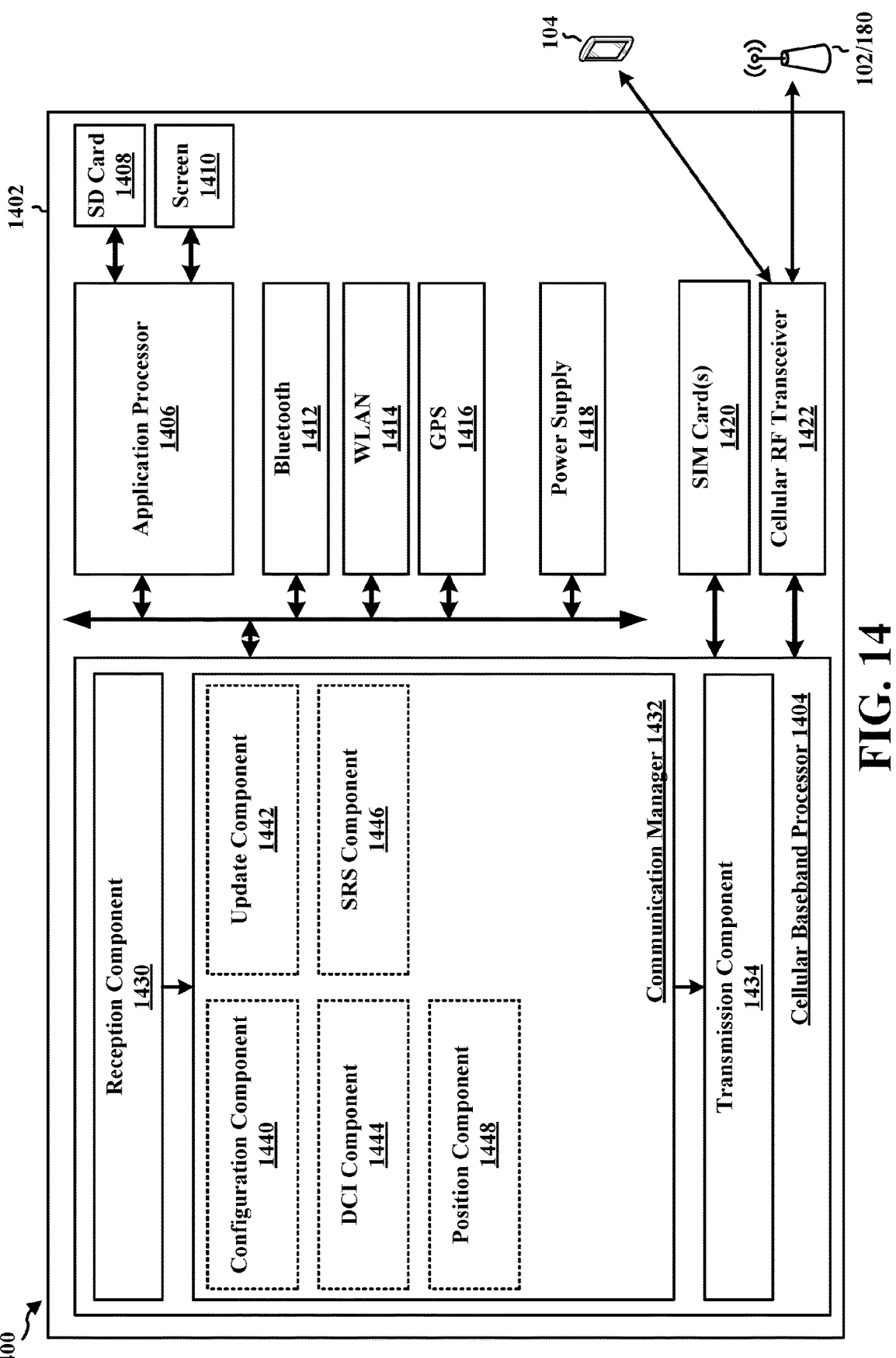
FIG. 14 is a diagram illustrating an example of a hardware implementation for an example apparatus.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/ memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component

1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 includes a configuration component 1440 that is configured to receive an SRS resource set trigger list configuration, e.g., as described in connection with 1202 of FIG. 12 or 1302 of FIG. 13. The configuration component 1440 may be configured to receive a configuration for positioning reference signals, e.g., as described in connection with 1314 of FIG. 13. The communication manager 1432 further includes an update component 1442 that is configured to receive an updated trigger list value, e.g., as described in connection with 1204 of FIG. 12 or 1304 of FIG. 13. The update component 1442 may be configured to may receive an updated trigger list value to update the configuration for positioning reference signals, e.g., as described in connection with 1316 of FIG. 13. The communication manager 1432 further includes a DCI component 1444 that is configured to receive DCI from the base station, e.g., as described in connection with 1306 of FIG. 13. The DCI component 1444 may be further configured to receive DCI from the base station to trigger the at least one SRS resource set, e.g., as described in connection with 1310 of FIG. 13. The communication manager 1432 further includes an SRS component 1446 that is configured to transmit at least one SRS, e.g., as described in connection with 1308 of FIG. 13. The SRS component 1446 may be configured to transmit at least one SRS based on the updated SRS resource set trigger list configuration, e.g., as described in connection with 1206 of FIG. 12 or 1312 of FIG. 13. The communication manager 1432 further includes a position component 1448 that is configured to transmit at least one positioning reference signal, e.g., as described in connection with 1318 of FIG. 13.

The apparatus may include additional components that perform each of the blocks of the algorithm in the flowcharts of FIG. 12 or 13. As such, each block in the flowcharts of FIG. 12 or 13 may be performed by a component and the apparatus may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, includes means for receiving, from a base station, an SRS resource set trigger list configuration via RRC signaling. The apparatus includes means for receiving, from the base station, an updated trigger list value via MAC-CE to update the SRS resource set trigger list configuration. A trigger state of at least one SRS resource set is updated based on the updated trigger list value. The apparatus includes means for transmitting, to the base station, at least one SRS based on the updated SRS resource set trigger list configuration. The apparatus further includes means for receiving, from the base station, DCI to trigger the at least one SRS resource set. The apparatus further includes means for transmitting at least one SRS based on the SRS resource set trigger list configuration prior to the updated SRS resource set trigger list configuration being enabled. The apparatus further includes means for receiving, from the base station, DCI to trigger the at least one SRS resource set. The DCI further includes instructions for the UE to change an active BWP. The apparatus further includes means for receiving, from the base station, a configuration for positioning reference signals via RRC signaling. The apparatus further includes means for receiving, from the base station, an updated trigger list value via MAC-CE to update the configuration for positioning reference signals. The apparatus further includes means for transmitting, to the base station, at least one positioning reference signal based on the updated trigger list value. The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to receive, from a base station, an SRS resource set trigger list configuration via RRC signaling; receive, from the base station, an updated trigger list value via MAC-CE to update the SRS resource set trigger list configuration, wherein a trigger state of at least one SRS resource set is updated based on the updated trigger list value; and transmit, to the base station, at least one SRS based on the updated SRS resource set trigger list configuration.

Aspect 2 is the apparatus of aspect 1, further including a transceiver coupled to the at least one processor.

Aspect 3 is the apparatus of any of aspects 1 and 2, further including that the MAC-CE includes an SRS resource set identifier, wherein the updated trigger list value corresponds to an SRS resource set based on the SRS resource set identifier.

Aspect 4 is the apparatus of any of aspects 1-3, further including that the SRS resource set identifier is utilized with a bit map to correspond with the updated trigger list value.

Aspect 5 is the apparatus of any of aspects 1-4, further including that a plurality of SRS resource sets is updated based on the updated trigger list value.

Aspect 6 is the apparatus of any of aspects 1-5, further including that a respective trigger state of each of the plurality of SRS resource sets is updated based on the MAC-CE.

Aspect 7 is the apparatus of any of aspects 1-6, further including that one or more SRS resource sets are added to the trigger state based on the updated trigger list value.

Aspect 8 is the apparatus of any of aspects 1-7, further including that one or more SRS resource set are removed from the trigger state based on the updated trigger list value.

Aspect 9 is the apparatus of any of aspects 1-8, further including that the MAC-CE is further configured to update SRS resource set parameters.

Aspect 10 is the apparatus of any of aspects 1-9, further including that the updated SRS resource set parameters includes at least one of a slot offset for each SRS resource set or a start position for each SRS resource.

Aspect 11 is the apparatus of any of aspects 1-10, further including that the MAC-CE includes an SRS resource set identifier and the updated SRS resource set parameters.

Aspect 12 is the apparatus of any of aspects 1-11, further including that the updated SRS resource set parameters includes at least one of a slot offset, associated CSI-RS resource, power control parameters, path loss reference signal, or spatial filters for SRS resources within the SRS resource set.

Aspect 13 is the apparatus of any of aspects 1-12, further configured to receive, from the base station, DCI to trigger the at least one SRS resource set; and transmit at least one SRS based on the SRS resource set trigger list configuration prior to the updated SRS resource set trigger list configuration being enabled.

Aspect 14 is the apparatus of any of aspects 1-13, further configure to receive, from the base station, DCI to trigger the at least one SRS resource set, wherein the DCI further includes instructions for the UE to change an active BWP.

Aspect 15 is the apparatus of any of aspects 1-14, further including that the MAC-CE is not utilized to update the SRS resource set trigger list configuration if the MAC-CE does not include a BWP identifier associated with a corresponding BWP, wherein the UE changes the active BWP without updating the SRS resource set trigger list configuration.

Aspect 16 is the apparatus of any of aspects 1-14, further including that the MAC-CE is utilized to update the SRS resource set trigger list configuration and the UE changes the active BWP based on the instructions within the DCI, if the MAC-CE includes a BWP identifier associated with a corresponding BWP.

Aspect 17 is the apparatus of any of aspects 1-15, further including that the MAC-CE includes one or more CC identifiers.

Aspect 18 is the apparatus of any of aspects 1-16, further including that the MAC-CE updates a trigger list of a plurality of CCs.

Aspect 19 is the apparatus of any of aspects 1-17, further including that the MAC-CE updates a trigger list for one CC.

Aspect 20 is the apparatus of any of aspects 1-18, further configured to receive, from the base station, a configuration for positioning reference signals via RRC signaling; receive, from the base station, an updated trigger list value via MAC-CE to update the configuration for positioning reference signals; and transmit, to the base station, at least one positioning reference signal based on the updated trigger list value.

Aspect 21 is a method of wireless communication for implementing any of aspects 1-20.

Aspect 22 is an apparatus for wireless communication including means for implementing any of aspects 1-20.

Aspect 23 is a computer-readable medium storing computer executable code, where the code when executed by a processor causes the processor to implement any of aspects 1-20.

Aspect 24 is an apparatus for wireless communication including at least one processor coupled to a memory and configured to transmit, to a UE, an SRS resource set trigger list configuration via RRC signaling; transmit, to the UE, an updated trigger list value via MAC-CE to update the SRS resource set trigger list configuration, wherein a trigger state of at least one SRS resource set is updated based on the updated trigger list value; and receive, from the UE, at least one SRS based on the updated SRS resource set trigger list configuration.

Aspect 25 is the apparatus of aspect 24, further including a transceiver coupled to the at least one processor.

Aspect 26 is the apparatus of any of aspects 24 and 25, further including that the MAC-CE includes an SRS resource set identifier, wherein the updated trigger list value corresponds to an SRS resource set based on the SRS resource set identifier.

Aspect 27 is the apparatus of any of aspects 24-26, further including that the SRS resource set identifier is utilized with a bit map to correspond with the updated trigger list value.

Aspect 28 is the apparatus of any of aspects 24-27, further including that a plurality of SRS resource sets is updated based on the updated trigger list value.

Aspect 29 is the apparatus of any of aspects 24-28, further including that a respective trigger state of each of the plurality of SRS resource sets is updated based on the MAC-CE.

Aspect 30 is the apparatus of any of aspects 24-29, further including that one or more SRS resource sets are added to the trigger state based on the updated trigger list value.

Aspect 31 is the apparatus of any of aspects 24-30, further including that one or more SRS resource set are removed from the trigger state based on the updated trigger list value.

Aspect 32 is the apparatus of any of aspects 24-31, further including that the MAC-CE is further configured to update SRS resource set parameters.

Aspect 33 is the apparatus of any of aspects 24-32, further including that the updated SRS resource set parameters includes at least one of a slot offset for each SRS resource set or a start position for each SRS resource.

Aspect 34 is the apparatus of any of aspects 24-33, further including that the MAC-CE includes an SRS resource set identifier and the updated SRS resource set parameters.

Aspect 35 is the apparatus of any of aspects 24-34, further including that the updated SRS resource set parameters includes at least one of a slot offset, associated CSI-RS resource, power control parameters, path loss reference signal, or spatial filters for SRS resources within the SRS resource set.

Aspect 36 is the apparatus of any of aspects 24-35, further configured to transmit, to the UE, DCI to trigger the at least one SRS resource set; and receive at least one SRS based on the SRS resource set trigger list configuration prior to the updated SRS resource set trigger list configuration being enabled.

Aspect 37 is the apparatus of any of aspects 24-36, further configured to transmit, to the UE, DCI to trigger the at least one SRS resource set, wherein the DCI further includes instructions for the UE to change an active BWP.

Aspect 38 is the apparatus of any of aspects 24-37, further including that the UE does not utilize the MAC-CE to update the SRS resource set trigger list configuration if the MAC-CE does not include a BWP identifier associated with a corresponding BWP, wherein the active BWP is changed without updating the SRS resource set trigger list configuration.

Aspect 39 is the apparatus of any of aspects 24-38, further including that the UE utilizes the MAC-CE to update the SRS resource set trigger list configuration and changes the active BWP based on the instructions within the DCI, if the MAC-CE includes a BWP identifier associated with a corresponding BWP.

Aspect 40 is the apparatus of any of aspects 24-39, further including that the MAC-CE includes one or more CC identifiers.

Aspect 41 is the apparatus of any of aspects 24-40, further including that the MAC-CE updates a trigger list of a plurality of CCs.

Aspect 42 is the apparatus of any of aspects 24-41, further including that the MAC-CE updates a trigger list for one CC.

Aspect 43 is the apparatus of any of aspects 24-42, further configured to transmit, to the UE, a configuration for positioning reference signals via RRC signaling; transmit, to the UE, an updated trigger list value via MAC-CE to update the configuration for positioning reference signals; and receive, from the UE, at least one positioning reference signal based on the updated trigger list value.

Aspect 44 is a method of wireless communication for implementing any of aspects 24-43.

Aspect 45 is an apparatus for wireless communication including means for implementing any of aspects 24-43.

Aspect 46 is a computer-readable medium storing computer executable code, where the code when executed by a processor causes the processor to implement any of aspects 24-43.

What is claimed is:

1. An apparatus for wireless communication at a user equipment (UE), comprising:
   memory; and
   at least one processor coupled to the memory and configured to:
      receive, from a base station via radio resource control (RRC) signaling, a sounding reference signal (SRS) resource set trigger list configuration indicating a plurality of SRS resource set identifiers, wherein each SRS resource set identifier of the plurality of SRS resource set identifiers is associated with a downlink control information (DCI) field value and with at least one SRS resource set;
      receive, from the base station via a medium access control (MAC) control element (CE) (MAC-CE), an updated trigger list value to update the SRS resource set trigger list configuration, wherein the updated trigger list value indicates an update for an association between at least one SRS resource set identifier of the plurality of SRS resource set identifiers and the at least one SRS resource set, and wherein a trigger state of the at least one SRS resource set is updated based on the updated trigger list value; and
      transmit, to the base station, at least one SRS based on an updated SRS resource set trigger list configuration.

2. The apparatus of claim 1, further comprising a transceiver coupled to the at least one processor.

3. The apparatus of claim 1, wherein the MAC-CE includes an SRS resource set identifier, wherein the updated trigger list value corresponds to an SRS resource set based on the SRS resource set identifier.

4. The apparatus of claim 3, wherein the SRS resource set identifier is utilized with a bit map to correspond with the updated trigger list value.

5. The apparatus of claim 1, wherein a plurality of SRS resource sets is updated based on the updated trigger list value.

6. The apparatus of claim 5, wherein a respective trigger state of each of the plurality of SRS resource sets is updated based on the MAC-CE.

7. The apparatus of claim 1, wherein one or more SRS resource sets are added to the trigger state based on the updated trigger list value.

8. The apparatus of claim 1, wherein one or more SRS resource set are removed from the trigger state based on the updated trigger list value.

9. The apparatus of claim 1, wherein the MAC-CE is further configured to update SRS resource set parameters, wherein the updated SRS resource set parameters includes at least one of a slot offset for each SRS resource set or a start position for each SRS resource, wherein the MAC-CE includes an SRS resource set identifier and the updated SRS resource set parameters.

10. The apparatus of claim 1, wherein the at least one processor is further configured to:
   receive, from the base station, downlink control information (DCI) to trigger the at least one SRS resource set; and
   transmit at least one SRS based on the SRS resource set trigger list configuration prior to the updated SRS resource set trigger list configuration being enabled.

11. The apparatus of claim 1, wherein the at least one processor is further configured to:
   receive, from the base station, downlink control information (DCI) to trigger the at least one SRS resource set, wherein the DCI further includes instructions for the UE to change an active bandwidth part (BWP).

12. A method of wireless communication at a user equipment (UE), comprising:
   receiving, from a base station via radio resource control (RRC) signaling, a sounding reference signal (SRS) resource set trigger list configuration indicating a plurality of SRS resource set identifiers, wherein each SRS resource set identifier of the plurality of SRS resource set identifiers is associated with a downlink control information (DCI) field value and with at least one SRS resource set;
   receiving, from the base station via a medium access control (MAC) control element (CE) (MAC-CE), an updated trigger list value to update the SRS resource set trigger list configuration, wherein the updated trigger list value indicates an update for an association between at least one SRS resource set identifier of the plurality of SRS resource set identifiers and the at least one SRS resource set, and wherein a trigger state of the at least one SRS resource set is updated based on the updated trigger list value; and
   transmitting, to the base station, at least one SRS based on an updated SRS resource set trigger list configuration.

13. The method of claim 12, wherein the MAC-CE includes an SRS resource set identifier, wherein the updated trigger list value corresponds to an SRS resource set based on the SRS resource set identifier.

14. The method of claim 12, further comprising:
   receiving, from the base station, downlink control information (DCI) to trigger the at least one SRS resource set; and
   transmitting at least one SRS based on the SRS resource set trigger list configuration prior to the updated SRS resource set trigger list configuration being enabled.

15. The method of claim 12, further comprising:
   receiving, from the base station, downlink control information (DCI) to trigger the at least one SRS resource set, wherein the DCI further includes instructions for the UE to change an active bandwidth part (BWP).

16. An apparatus for wireless communication at a base station, comprising:
   memory; and
   at least one processor coupled to the memory and configured to:
      transmit, to a user equipment (UE) via radio resource control (RRC) signaling, a sounding reference signal (SRS) resource set trigger list configuration indicating a plurality of SRS resource set identifiers, wherein each SRS resource set identifier of the plurality of SRS resource set identifiers is associated with a downlink control information (DCI) field value and with at least one SRS resource set;
      transmit, to the UE via a medium access control (MAC) control element (CE) (MAC-CE), an updated trigger list value to update the SRS resource set trigger list configuration, wherein the updated trigger list value indicates an update for an association between at least one SRS resource set identifier of the plurality of SRS resource set identifiers and the at least one SRS resource set, and wherein a trigger state of the at least one SRS resource set is based on the updated trigger list value; and receive, from the UE, at least one SRS based on an updated SRS resource set trigger list configuration.

17. The apparatus of claim 16, further comprising a transceiver coupled to the at least one processor.

18. The apparatus of claim 16, wherein the MAC-CE includes an SRS resource set identifier, wherein the updated trigger list value corresponds to an SRS resource set based on the SRS resource set identifier.

19. The apparatus of claim 18, wherein the SRS resource set identifier is utilized with a bit map to correspond with the updated trigger list value.

20. The apparatus of claim 16, wherein a plurality of SRS resource sets is based on the updated trigger list value.

21. The apparatus of claim 20, wherein a respective trigger state of each of the plurality of SRS resource sets is based on the MAC-CE.

22. The apparatus of claim 16, wherein one or more SRS resource sets are included in the trigger state based on the updated trigger list value.

23. The apparatus of claim 16, wherein one or more SRS resource set are not included in the trigger state based on the updated trigger list value.

24. The apparatus of claim 16, wherein the MAC-CE is further configured to update SRS resource set parameters, wherein the updated SRS resource set parameters includes at least one of a slot offset for each SRS resource set or a start position for each SRS resource, wherein the MAC-CE includes an SRS resource set identifier and the updated SRS resource set parameters.

25. The apparatus of claim 16, wherein the at least one processor is further configured to:

transmit, to the UE, downlink control information (DCI) to trigger the at least one SRS resource set; and receive at least one SRS based on the SRS resource set trigger list configuration prior to the updated SRS resource set trigger list configuration being enabled.

26. The apparatus of claim 16, wherein the at least one processor is further configured to:

transmit, to the UE, downlink control information (DCI) to trigger the at least one SRS resource set, wherein the DCI further includes instructions for the UE to change an active bandwidth part (BWP).

27. A method of wireless communication at a base station, comprising:

transmitting, to a user equipment (UE) via radio resource control (RRC) signaling, a sounding reference signal (SRS) resource set trigger list configuration indicating a plurality of SRS resource set identifiers, wherein each SRS resource set identifier of the plurality of SRS resource set identifiers is associated with a downlink control information (DCI) field value and with at least one SRS resource set;

transmitting, to the UE via a medium access control (MAC) control element (CE) (MAC-CE), an updated trigger list value to update the SRS resource set trigger list configuration, wherein the updated trigger list value indicates an update for an association between at least one SRS resource set identifier of the plurality of SRS resource set identifiers and the at least one SRS resource set, and wherein a trigger state of the at least one SRS resource set is updated based on the updated trigger list value; and receiving, from the UE, at least one SRS based on an updated SRS resource set trigger list configuration.

28. The method of claim 27, wherein the MAC-CE includes an SRS resource set identifier, wherein the updated trigger list value corresponds to an SRS resource set based on the SRS resource set identifier.

29. The method of claim 27, further comprising:

transmitting, to the UE, downlink control information (DCI) to trigger the at least one SRS resource set; and receiving at least one SRS based on the SRS resource set trigger list configuration prior to the updated SRS resource set trigger list configuration being enabled.

30. The method of claim 27, further comprising:

transmitting, to the UE, downlink control information (DCI) to trigger the at least one SRS resource set, wherein the DCI further includes instructions for the UE to change an active bandwidth part (BWP).

* * * * *